US012269074B2

(12) United States Patent
Pezzutti

(10) Patent No.: US 12,269,074 B2
(45) Date of Patent: Apr. 8, 2025

(54) SYSTEM AND METHOD FOR CLEANING TURBINE COMPONENTS

(71) Applicant: General Electric Company, Schenectady, NY (US)

(72) Inventor: Mark Dean Pezzutti, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/084,173

(22) Filed: Dec. 19, 2022

(65) Prior Publication Data

US 2023/0330716 A1 Oct. 19, 2023

Related U.S. Application Data

(60) Provisional application No. 63/330,594, filed on Apr. 13, 2022.

(51) Int. Cl.
*B08B 7/00* (2006.01)
*B08B 5/04* (2006.01)

(52) U.S. Cl.
CPC .............. *B08B 7/0071* (2013.01); *B08B 5/04* (2013.01); *B08B 2205/00* (2013.01)

(58) Field of Classification Search
CPC ...... B08B 7/0071; B08B 5/04; B08B 2205/00
See application file for complete search history.

(56) References Cited

U.S. PATENT DOCUMENTS 4,098,450 A 7/1978 Keller
4,405,379 A 9/1983 Chasteen
4,975,147 A 12/1990 Tahara
5,346,563 A * 9/1994 Allen ........................ C22F 1/02 75/10.17
5,536,330 A * 7/1996 Chen ..................... C23C 14/564 34/410
8,206,488 B2 6/2012 Mantkowski
9,469,904 B2 10/2016 Niu
(Continued)

FOREIGN PATENT DOCUMENTS

CN 103781942 5/2014
CN 106835178 6/2017
(Continued)

OTHER PUBLICATIONS

Sigma Aldrich, Hydrogen, pp. 1-11 (Year: 2023).*
(Continued)

*Primary Examiner* — Sharidan Carrillo
(74) *Attorney, Agent, or Firm* — Fitch, Even, Tabin & Flannery LLP

(57) ABSTRACT

A furnace system includes at least one wall that defines a workspace. The workspace includes an aircraft part to be cleaned. One or more vacuum pumps are configured to achieve a predetermined vacuum level in the workspace. A gas purifier is configured to remove impurities in a gas to create a purified gas, the purified gas being directed from the gas purifier into the workspace, the purified gas being of a purity and composition that is effective to disassociate oxides on a surface or in a crack of the aircraft part to be cleaned when the workspace is heated to a predetermined temperature and the predetermined vacuum level is achieved in the workspace.

18 Claims, 9 Drawing Sheets

(56) References Cited

U.S. PATENT DOCUMENTS

| | | | | |
|---|---|---|---|---|
| 9,957,066 | B2 | 5/2018 | Bewlay | |
| 11,027,317 | B2 | 6/2021 | Tibbetts | |
| 11,441,446 | B2 | 9/2022 | Rawson | |
| 2005/0126593 | A1* | 6/2005 | Budinger | B08B 7/0071 134/21 |
| 2008/0053234 | A1* | 3/2008 | Staroselsky | G01N 25/72 73/649 |
| 2013/0048015 | A1 | 2/2013 | Mantkowski | |
| 2016/0101446 | A1* | 4/2016 | Schwarting | F01D 5/005 134/2 |
| 2017/0204739 | A1 | 7/2017 | Rawson | |
| 2018/0155060 | A1 | 6/2018 | Dauenhauer | |
| 2018/0355751 | A1 | 12/2018 | Tibbetts | |
| 2019/0015776 | A1* | 1/2019 | Chi | C01B 3/505 |
| 2019/0153890 | A1 | 5/2019 | Eriksen | |
| 2019/0337073 | A1* | 11/2019 | Ozbaysal | F01D 5/005 |
| 2020/0376547 | A1 | 12/2020 | Silidker | |
| 2022/0055772 | A1* | 2/2022 | Chatterjee | F01D 5/286 |
| 2022/0276006 | A1* | 9/2022 | Oo | F27D 19/00 |

FOREIGN PATENT DOCUMENTS

| | | | | |
|---|---|---|---|---|
| CN | 110230069 | | 9/2019 | |
| EP | 1491643 | A2 * | 12/2004 | C21D 1/74 |
| WO | WO-9735805 | A1 * | 10/1997 | B01D 53/0431 |
| WO | 2007048698 | | 5/2007 | |
| WO | 2020167802 | | 8/2020 | |

OTHER PUBLICATIONS

N. Bredzs and C. C. Tennenhouse; "Metal-Metal Oxide-Hydrogen Atmosphere Chart for Brazing or Bright Metal Processing", Welding Research Counsel (WRC); May 1970; (pp. 189-193).

* cited by examiner

SYSTEM AND METHOD FOR CLEANING TURBINE COMPONENTS

CROSS-REFERENCE TO RELATED APPLICATION(S)

This application claims the benefit of U.S. Provisional Application No. 63/330,594 filed Apr. 13, 2022, which is incorporated herein by reference in its entirety.

TECHNICAL FIELD

These teachings relate generally to approaches for cleaning turbine components.

BACKGROUND

Turbine engines (such as gas turbine engines used with aircraft) have different components that sometimes become covered with oxides. When the oxide accumulation becomes too great, then the part may not operate properly or may operate inefficiently. Oxides can enter or contaminate cracks that develop in these parts or components. In addition, the accumulation of oxides makes it difficult to repair these parts, for example, when cracks develop.

BRIEF DESCRIPTION OF THE DRAWINGS

Various needs are at least partially met through provision of the method and apparatus for cleaning turbine components, particularly when studied in conjunction with the drawings. A full and enabling disclosure of the aspects of the present description, including the best mode thereof, directed to one of ordinary skill in the art, is set forth in the specification, which refers to the appended figures, in which.

Figure 1:
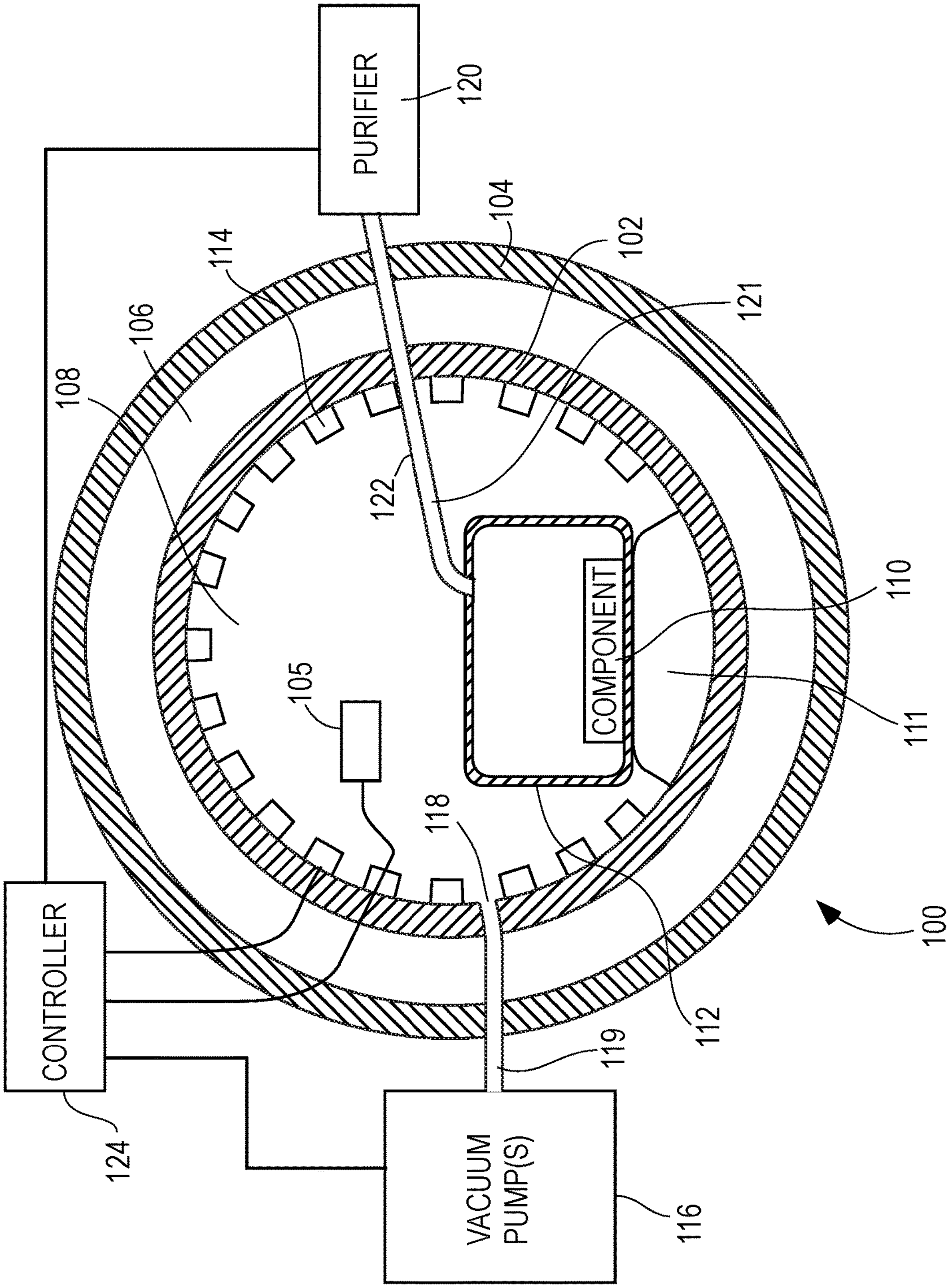
FIG. 1 comprises a cross-sectional diagram of a furnace system as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

The approaches provided herein provide a vacuum furnace system that is configured to reduce or eliminate surface oxides on turbine parts or components (e.g., gas turbine components) or within cracks that develop within these parts or components. In aspects, these approaches use a non-reducing gas such as Argon to reduce oxides and/or ultra-high purity reducing gases (e.g., Hydrogen) in a furnace to clean turbine parts or components. A reducing gas will remove Oxygen from metal oxides from a component's surface at typically an elevated temperature.

Advantageously, the approaches provided herein provide a furnace that removes oxides from turbine parts or components. The presence of oxides make brazing and/or other repairs difficult or impossible to accomplish. In one example, the present approaches turn chromium oxide ($Cr_2O_3$) into chromium and water. In aspects, the chromium remains on the component and does not pose a repair issue, and water can easily be removed from the furnace and/or the part or component being cleaned.

Previous approaches used a fluoride gas to remove oxides from turbine parts or components. However, this gas is extremely poisonous and is highly regulated. Since the present approaches do not use Fluoride Ion cleaning technologies, the present approaches are much safer to use than previous approaches. The present approaches also do not carry much if any regulatory burden making them easier to deploy and use.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

The foregoing and other benefits may become clearer upon making a thorough review and study of the following detailed description.

Referring now to FIG. 1, one example of a furnace 100 for removing, reducing, and/or or cleaning oxides from turbine components is described. Oxides are typically removed from surfaces of the turbine components, but also may be removed from cracks that develop within these components.

These approaches apply one or more purified gases to a turbine part or component to be cleaned. For example, purified Hydrogen is applied and then purified Argon is applied. The purified Hydrogen removes oxides from the part or component to be cleaned. The purpose of applying the purified Argon is to maintain part cleanliness after the part has been cleaned of surface oxides.

The furnace 100 includes a first wall 102 that is surrounded by a second wall 104. A volume 106 spaces the first wall 102 from the second wall 104. In aspects, the volume 106 may be filled with a cooling fluid or some other cooling or insulating material. The first wall 102 and the second wall 104 define a workspace 108, which is a generally spherical volume in the example of FIG. 1.

The workspace 108 holds a turbine part or component 110 to be cleaned. The workspace 108 is a volume and accessible through a controlled opening (e.g., a door, not shown in FIG. 1) in the first wall 102 and the second wall 104. In this example, the first wall 102 and the second wall 104 are spherical (or generally spherical) in shape to define the workspace 108. The first wall 102 and the second wall 104 may be constructed of stainless steel or some other suitable material.

In the example of FIG. 1, the first wall 102 and the second wall 104 define a furnace 100 that is generally spherical in shapes. A controlled opening (not shown in FIG. 1) provides access to the workspace 108, which is the interior of the furnace 100. It will be appreciated that that furnace 100 can be configured to be shaped in different ways. For example, the furnace 100 can be configured to be boxed-shaped or be configured or shaped in some other configuration.

The turbine part or component 110 resides in a containment structure 112. The turbine part or component 110 may be a nozzle. Although the examples described herein describe the cleaning of turbine parts or components (e.g., as used in aircraft), it will be appreciated that the approaches provided herein can be used to clean other types of parts or components as well.

The containment structure 112 is spaced from the first wall 102 and is disposed in the workspace 108. A gas purifier 120 purifies the gas. The containment structure 112 is configured to hold the turbine part or component 110 to be cleaned and to contain the purified gas in a vicinity of the turbine part or component 110 to be cleaned.

The containment structure 112 may be disposed on a stand 111. The stand 111 may be constructed of an appropriate metal that can support the containment structure 112 and withstand the heat of the furnace 100.

The containment structure 112 is configured to allow the purified gases introduced in the workspace 108 to be concentrated and directed about or onto the turbine part or component 110 before the purified gases disperse. The containment structure 112 can be constructed of a metal that can sustain high temperatures, such as molybdenum, and that can contain and direct the purified gas.

The containment structure 112 can assume a variety of different forms. In one example and as shown in FIG. 1, the containment structure is box-shaped and purified gas is directed into the containment structure 112 from the gas purifier 120 via a tube or passageway 121. Vacuum pumps 116 are configured to draw the purified gas out of the containment structure 112. An opening (not shown) on one end of the containment structure 112 allows the vacuum pumps 116 to draw the purified gas out of the containment structure 112. The pumping action of the vacuum pump 116 effectively moves or flows the purified gas over or around the part or component 110 to be cleaned.

In the example of FIG. 1, a single containment structure 112 is shown. However, it will be appreciated that multiple containment structures 112 can also be used. In some examples, these multiple containment structures may be disposed of the bottom of the workspace 108 and, in other examples, the containment structures may be stacked. In addition, each containment structure may include one or more parts or components to be cleaned. The sizing, dimensions or shapes of the containment structures may be selected based upon the size of the part or component 110 to be cleaned and/or the size of the workspace 108 to mention two examples.

A heating element 114 is disposed about the first wall 102. In aspects, the heating element 114 is attached to an inner surface of the first wall 102. The heating element 114 is configured to heat the workspace 108 to a predetermined temperature. In aspects, the heating element 114 may be a heating coil or coils, or similar elements.

The vacuum pumps 116 communicate with the workspace 108 via first ports 118 and a first tube or passageway 119. The vacuum pumps 116 are configured to achieve a predetermined vacuum level in the workspace 108. When in a vacuum, when heated, and when the purified gas is applied to the part or component 110 to be cleaned, deposits disassociate from the component 110. In particular, as the purified gas is applied in the vacuum and at the predetermined temperature (achieved by the heating elements 114), oxides on the surface and/or in cracks of the part or component 110 to be cleaned are disassociated from the component 110 (e.g., from the metal that forms the part or component 110 to be cleaned).

In one example, the vacuum pumps 116 comprise three vacuum pumps. More specifically, the vacuum pumps 116 comprise a roughing pump configured to provide a first value of first vacuum level measurement in the workspace 108, a blower pump configured to provide a second value of second vacuum level measurement in the workspace 108, and a diffusion pump configured to provide a third value of third vacuum level measurement in the workspace 108, wherein the first value is greater than the second value, and the second value is greater than the third value. The configuration of these three pumps is described in greater detail with respect to FIG. 9 below. The vacuum level has a magnitude with a greater magnitude signifying more of a vacuum (e.g., less gas) than a lower magnitude. In aspects, the vacuum level is a measure of pressure.

The gas purifier 120 communicates with the workspace 108 via a second port 122 and a tube or passageway 121. In the example of FIG. 1, the tube or passageway 121 extends through the second port 122 and is connected to an opening 123 in the containment structure 112. The gas purifier 120 is configured to remove impurities in a gas to create a purified gas. The purified gas being directed from the gas purifier 120 into the workspace 108, and in this case, inside the containment structure 112 where the turbine part or component 110 is located.

A controller 124 controls operation of the heating elements 114, the vacuum pumps 116, and the gas purifier 120. More specifically, the controller 124 may execute software programs that activate and deactivate the heating elements 114, vacuum pumps 116, and gas purifier 120 at specific times and according to a specific schedule. In other aspects, operational aspects (e.g., speed) of these devices is controlled. For example, the temperature provided by the heating elements 114 can be controlled.

It will be appreciated that as used herein the term "controller" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here.

The controller 124 may be configured (for example, by using corresponding programming stored in a memory as will be well understood by those skilled in the art) to carry out one or more of the steps, actions, and/or functions described herein. The controller 124 may include a memory that includes computer instructions that implement any of the functions described herein.

Various sensors 105 couple to the controller 124. The sensors 105 may include sensors for sensing temperature and vacuum level. As described elsewhere herein, the sensed values may be used to control the operation of the system.

The purified gas is of a purity and composition that is effective to disassociate oxides on a surface or in a crack of the turbine part or component 110 to be cleaned when the workspace 108 is heated to the predetermined temperature and the predetermined vacuum level is achieved in the workspace 108. "Purity" refers to the amount of impurities in the gas. As an example, a bottle of gas from a supplier could be 99.998% pure with the remaining 0.002% being impurities (typically water vapor). "Composition" refers to the gas being introduced into the furnace, with examples being Argon and Hydrogen. In one example, the furnace 100 is evacuated to a vacuum level of around 10-5 torr, Hydrogen or argon is introduced at a temperature of 1400-1800 degrees F.

Hydrogen and argon are two examples of gases that can be used in the processes provided herein. Various purity levels of gases can be used. These purity levels may relate or specify a purity level of the gas as delivered to the gas purifier 120 (e.g., the argon and/or hydrogen), and the level of purity that is attained after passing these gases through the gas purifier 120. As explained with respect to FIG. 8 below, a selection (either automatic or manual) may be made to select a specific purity level for a gas to remove a specific type of oxide.

Purity levels can also relate to the purity level of gas as received from a gas supplier and the purity level achieved after the gas has been purified by the gas purifier 120. In some aspects, the as-received purity for Argon can be 99.998% or greater and the-received purity for Hydrogen can be 99.998% or greater. In other aspects and after passing through the gas purifier 120, the purity level for Argon can be 99.9999% or greater; after passing through the gas purifier 120, the purity level for Hydrogen can be 99.9999% or greater.

In one example of the operation of the system of FIG. 1, the turbine part or component 110 to be cleaned is placed within the containment structure 112 in the workspace 108 within the furnace 100 (the furnace 100 being defined by collectively the first wall 102, the second wall 104 and the heating element 114). The furnace 100 may have a controlled opening (e.g., door 410 in FIG. 4A and FIG. 4B) and the turbine part or component 110 to be cleaned is placed inside the furnace 100 through the opening.

When the controlled opening (e.g., the door) is closed, the vacuum pumps 116 are operated (e.g., by the controller 124 executing computer instructions) to achieve a predetermined vacuum level in the workspace 108. The workspace 108 is heated to the predetermined temperature. In examples, the predetermined temperature is greater than 1500 degrees F. and the predetermined vacuum level is less than $10^{-5}$ Torr. These operations may be controlled by the controller 124 executing computer instructions.

A gas is supplied to a gas purifier 120 and the gas purifier 120 removes impurities in a gas to create a purified gas 204. These operations may also be controlled by the controller 124 executing computer instructions.

The purified gas is directed into the workspace 108, and in this example, to the containment structure 112. The directing is accomplished at least in part by flowing the purified gas 204 through the tube or passageway 121 into the containment structure 112. As mentioned, the purified gas 204 is of a purity and composition that is effective to disassociate oxides on a surface or in a crack of the component 110 to be cleaned when the workspace 108 is heated to the predetermined temperature and the predetermined vacuum level is achieved in the workspace 108.

As the workspace 108 is evacuated, the purified gas 204 (flowing in the containment structure 112) is drawn across the turbine part or component 110 by the vacuum pumps 116. The combination of the vacuum in the workspace 108, application of the purified gas 204 to the part or component 110 to be cleaned, and the heating of the workspace 108 is effective to remove or eliminate oxides from the turbine part or component 110 to be cleaned.

Figure 2A:
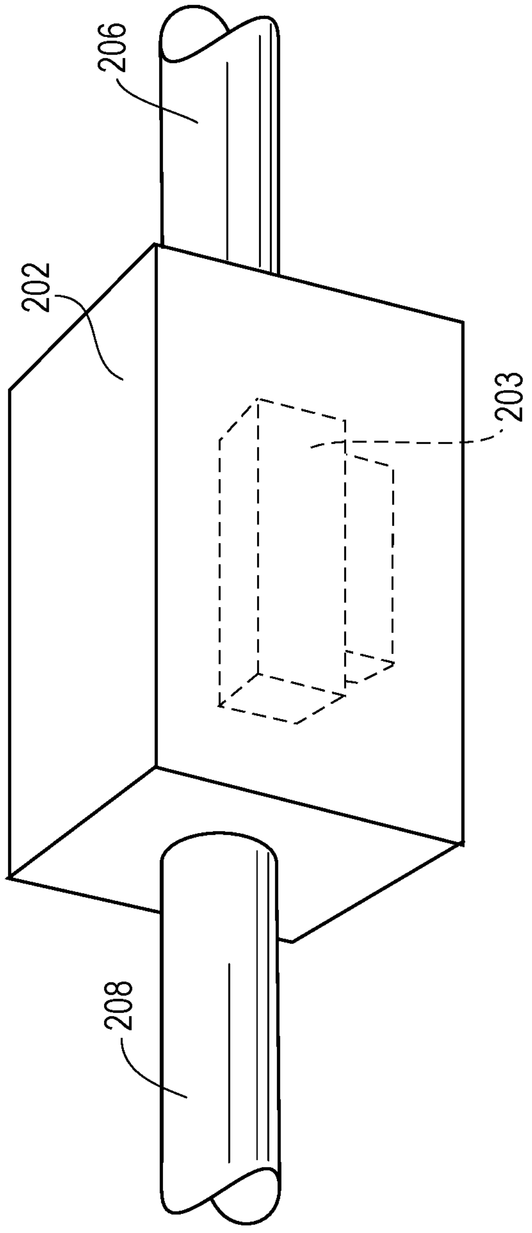
FIG. 2A comprises a perspective diagram of a containment structure in accordance with various embodiments of these teachings.
Figure 2B:
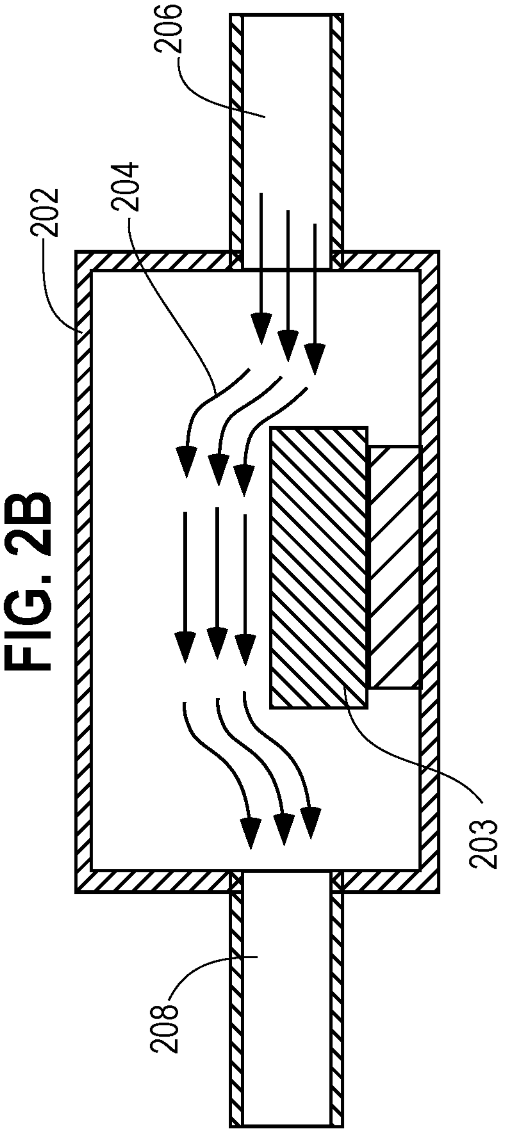
FIG. 2B comprises a cross-sectional diagram of a containment structure of FIG. 2A in accordance with various embodiments of these teachings.

Referring now to FIG. 2A and FIG. 2B, an example of a containment structure 202 is described. In aspects, the containment structure 202 is a hollow box-like structure. A lid may open and allow a component or part 203 to be inserted inside the containment structure 202.

Purified gas 204 from a purifier enters through a first tube 206. The purified gas 204 flows over the turbine part or component 110 to be cleaned and exits through a second tube 208. In aspects, the second tube 208 may be removed (as shown in the example of FIG. 1).

As the vacuum pumps 116 are activated to evacuate the containment structure 202, the purified gas 204 (flowing in the containment structure 202) is drawn across the turbine part or component 203 by the vacuum pumps 116 and out of the containment structure 202 through the second tube 208. The combination of the vacuum in the containment structure 202, application of the purified gas 204 to the part or component 203, and the heating of the workspace 108 (where the containment structure 202 is deployed) by the heating elements 114 is effective to remove or eliminate oxides from the turbine part or component 203.

Figure 3:
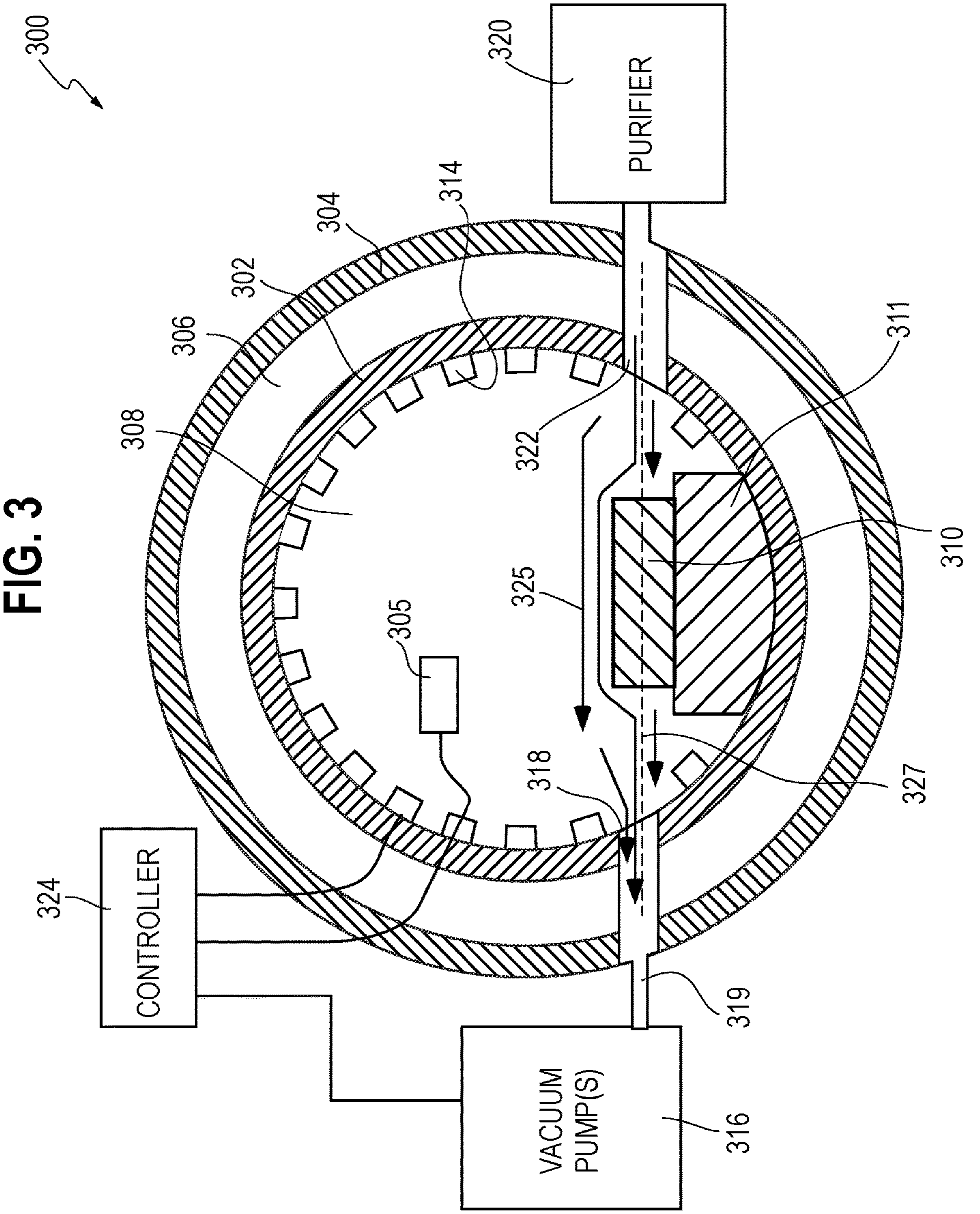
FIG. 3 comprises a cross-sectional diagram of a furnace system as configured in accordance with various embodiments of these teachings.

Referring now to FIG. 3, another example of a furnace 300 for removing or cleaning oxides from turbine components or parts is described. The furnace 300 differs from the furnace 100 of FIG. 1 in that the furnace 300 does not use a containment structure to hold the part or component to be cleaned. However, many of the components used in FIG. 3 are the same or similar as used in FIG. 1 and for the sake of brevity some of their descriptions and functions will not be repeated here.

The furnace 300 includes a first wall 302 that is surrounded by a second wall 304. A volume 306 spaces the first wall 302 from the second wall 304. In aspects, the volume 306 may be filled with a cooling fluid or an insulating material. Together, the first wall 302 and the second wall 304 define a workspace 308. The workspace 308 holds a turbine part or component 310 to be cleaned. The workspace 308 is a volume and accessible through a controlled opening (e.g., a door, not shown in FIG. 3) in the first wall 302 and the second wall 304. In this example, the first wall 302 and the second wall 304 are spherical (or generally spherical) in shape and are arranged to define the workspace 308. The first wall 302 and the second wall 304 may be constructed of stainless steel or some other suitable material.

In the example of FIG. 3 (and as with the example of FIG. 1), the first wall 302 and the second wall 304 define a furnace 300 that is generally spherical in shapes. A controlled opening (not shown in FIG. 3) provides access to the workspace 308, which is in the interior of the furnace 300. It will be appreciated that that furnace 300 can be shaped in different ways, for example, in a boxed-shaped or in some other shaped configuration.

The turbine part or component 310 to be cleaned resides on a stand 311 and is not placed in a containment structure. The stand 311 may be constructed of an appropriate metal that can support the turbine part or component 310 and withstand the heat of the furnace 300.

A heating element 314 is disposed about the first wall 302. In aspects, the heating element 314 is attached to an inner surface of the first wall 302. The heating element 314 is configured to heat the workspace 308 to a predetermined temperature. The heating element 314 may be a heating coil or coils, or similar elements.

Vacuum pumps 316 communicate with the workspace 308 via first ports 318 and a first tube or passageway 319. The vacuum pumps 316 are configured to achieve a predetermined vacuum level in the workspace 308.

In one example, the vacuum pumps 316 comprise three vacuum pumps. More specifically, the vacuum pumps 316 comprise a roughing pump configured to provide a first value of first vacuum level measurement in the workspace, a blower pump configured to provide a second value of second vacuum level measurement in the workspace and a diffusion pump configured to provide a third value of third vacuum level measurement in the workspace, wherein the first value is greater than the second value, and the second value is greater than the third value. An example of a three-pump configuration is described with respect to FIG. 9 described below.

A gas purifier 320 communicates with the workspace 308 via a second port 322. The gas purifier 320 is configured to remove impurities in a gas to create a purified gas 325. The purified gas being directed from the gas purifier 320 into the workspace 308 via the second port 322, and in this case, over, around, and/or about the turbine part or component 310.

A controller 324 controls operation of the heating elements 314, the vacuum pumps 316, and the gas purifier 320. More specifically, the controller 324 may execute software programs that activate and deactivate the heating elements 314, vacuum pumps 316, and gas purifier 320 at specific times and according to a specific schedule. In other aspects, operational aspects of these devices is controlled. For example, the temperature provided by the heating elements 314 can be controlled.

The controller 324 can be any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The controller 324 may be configured (for example, by using corresponding programming stored in a memory as will be well understood by those skilled in the art) to carry out one or more of the steps, actions, and/or functions described herein. The controller 324 may include a memory that includes computer instructions that implement any of the functions described herein.

Various sensors 305 couple to the controller 324. The sensors 305 may include sensors for sensing temperature and vacuum level. As described elsewhere herein, the sensed values may be used to control the operation of the system.

The purified gas is of a purity and composition that is effective to disassociate oxides on a surface or in a crack of the turbine part or component 310 when the workspace 308 is heated to the predetermined temperature and the predetermined vacuum level is achieved in the workspace 308. Examples of the purity levels are described elsewhere herein.

In one example of the operation of the system of FIG. 3, the turbine part or component 310 to be cleaned is placed on the stand 311 in the workspace 308 within the furnace 300 (collectively, the first wall 302, the second wall 304 and the heating element 314). As mentioned, the furnace 300 may have a controlled opening (e.g., a door) and the turbine part or component 310 to be cleaned is placed inside the furnace 300 onto the stand 311.

When the controlled opening (e.g., door) is closed and the workspace 308 is sealed, the vacuum pumps 316 are operated (e.g., by the controller 324 executing computer instructions) to achieve a predetermined vacuum level in the workspace 308. The workspace 308 is heated to the predetermined temperature by the heating elements 314. In examples, the predetermined temperature is greater than 1500 degrees F. and the predetermined vacuum level is less than $10^{-5}$ Torr. These operations may be controlled by the controller 324 executing computer instructions.

A gas 321 is supplied to a gas purifier 320, the gas purifier 320 remove impurities in a gas to create a purified gas 325. These operations may be controlled by the controller 324 executing computer instructions.

The purified gas is directed into the workspace 308, and in this example, flows through the workspace 308 and around, over, and about the turbine part or component 310 as shown by the arrows labeled 325. The operation of the vacuum pumps 316 draws the purified gas indicated by the arrows labelled 325 across the turbine part or component 310.

Arrangement of the first port 318, second port 322, part or component 310, and stand 311 is selected so as to allow the purified gas indicated by the arrows labelled 325 to be drawn across the turbine part or component 310 without dispersing or with minimal dispersion so as to not affect the disassociation of oxides on the turbine part or component 310. In other words, effective concentration of the purified gas indicated by the arrows labelled 325 is maintained. For example, as shown in FIG. 3, the first port 318, the second port 322, the turbine part or component 310 may be aligned along an axis 327, which extends horizontally above the bottom of the workspace 308. As mentioned, the purified gas is of a purity and composition that is effective to disassociate oxides on a surface or in a crack of the turbine part or component 310, as the purified gas is drawn across the turbine part or component 310, when the workspace 308 is heated to the predetermined temperature and the predetermined vacuum level is achieved in the workspace 308.

Figure 4A:
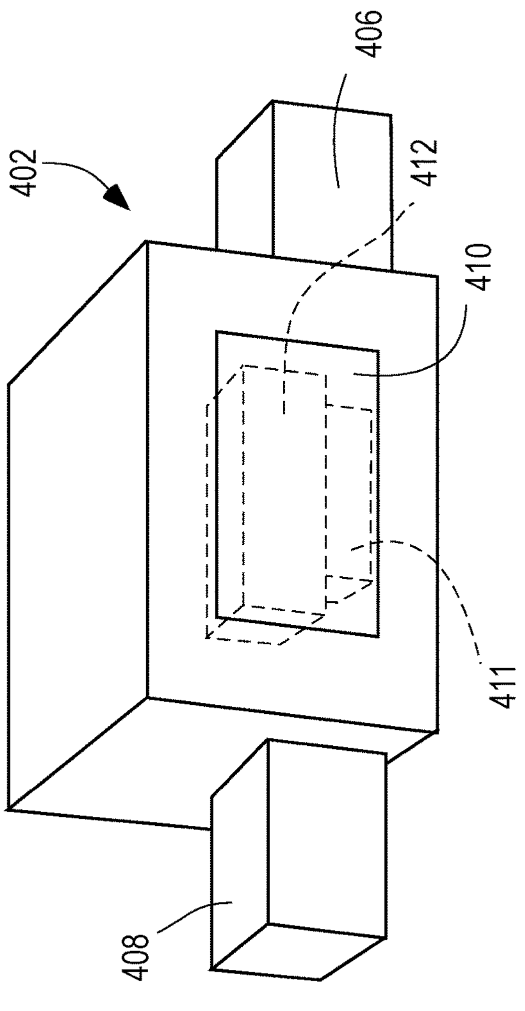
FIG. 4A comprises a perspective view of a furnace system as configured in accordance with various embodiments of these teachings.
Figure 4B:
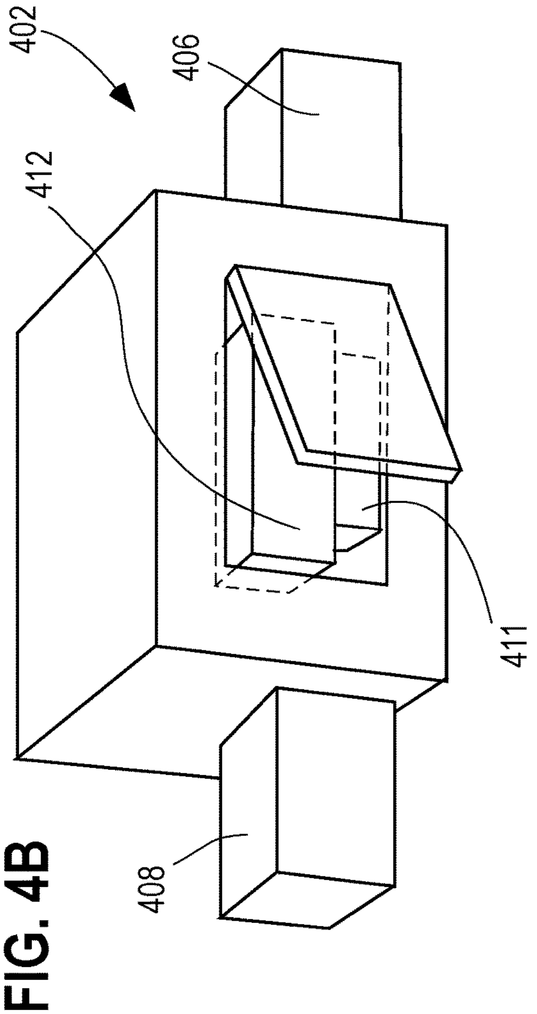
FIG. 4B comprises another perspective view of the furnace system of FIG. 4A as configured in accordance with various embodiments of these teachings.

Referring now to FIG. 4A and FIG. 4B, one example of a furnace 402 (showing an example furnace in external views) is described. In this case, the furnace 402 is box-shaped, and may include some or all the elements mentioned in FIG. 1, FIG. 2A, FIG. 2B and/or FIG. 3. The furnace 402 has a controlled opening (door) 410. Opening the controlled opening (door) 410 shows a turbine part or component 412 disposed on a stand 411. As mentioned (and with the examples of FIG. 1 and FIG. 3) the furnace 402 may be spherical in shape (or generally spherical in shape). Other shapes and combination of shapes are also possible.

A gas purifier 406 is disposed about one side of the furnace 402. One or more vacuum pumps 408 are disposed on the other side of the furnace 402.

These components and their operation and structure have been described above with respect to FIG. 1, FIG. 2A, FIG. 2B and/or FIG. 3 and will not be repeated here.

As shown in FIG. 4A, the controlled opening (door) 410 is closed. As shown in FIG. 4B, the controlled opening (door) 410 is opened and a turbine part or component 412 placed on a stand 411 (or inside a containment structure).

Figure 5:
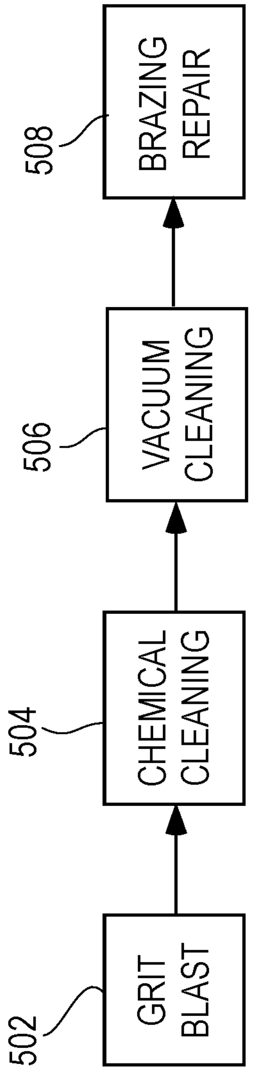
FIG. 5 comprises a flowchart of a cleaning process as configured in accordance with various embodiments of these teachings.

Referring now to FIG. 5, one example of a process 500 for cleaning a turbine part or component 110 is described. In this process 500, a turbine component or part 110 is cleaned. Step 506 of this overall process 500 is the vacuum cleaning process (achieved by application of one or more purified gases) as described herein.

At a step 502, a grit blast is performed on the part or component 110. In this step, a surface of the component 110 is blasted with a grit (e.g., composed of aluminum oxide). This allows some contaminants to be removed from the turbine part or component 110 such as some of the dirt or some of the grease that may be on the part or component 110.

At a step 504, a chemical cleaning (e.g., an alkaline clean) of the part or component 110 may be performed. This chemical cleaning step may be applied to remove more of the surface dirt on the part or component 110. However, it will be appreciated that this step will not generally remove any oxides on the part or component 110.

At the step 506, vacuum cleaning with purified gas is performed on the part or component 110. The process of vacuum cleaning with purified gas is described throughout this disclosure and removes oxides from the surface or cracks of the part or component 110. As mentioned, this process is performed in a furnace. The part or component 110 may be removed from the furnace once this is complete.

At a step 508, a brazing repair may be performed. When this step is about to be performed, the part or component 110 has been cleaned of surface contaminants such as dirt and grease (with steps 502 and 504), and cracks in the part or competent 110 has also been cleaned of oxides (with step 506). With the step 508, a crack in the part or component 110 that has been cleaned is repaired.

At the step 508, braze paste is applied to the crack. The braze paste includes metal particles that, when melted, will fill the crack. The braze paste (and its metal particles) melt at a lower temperature than the melting point of the part or component 110. When heat is applied to the braze paste, the binder in the paste is burned off, the metal particles melt, and the metal particles flow into the crack thereby repairing the crack.

Figure 6:
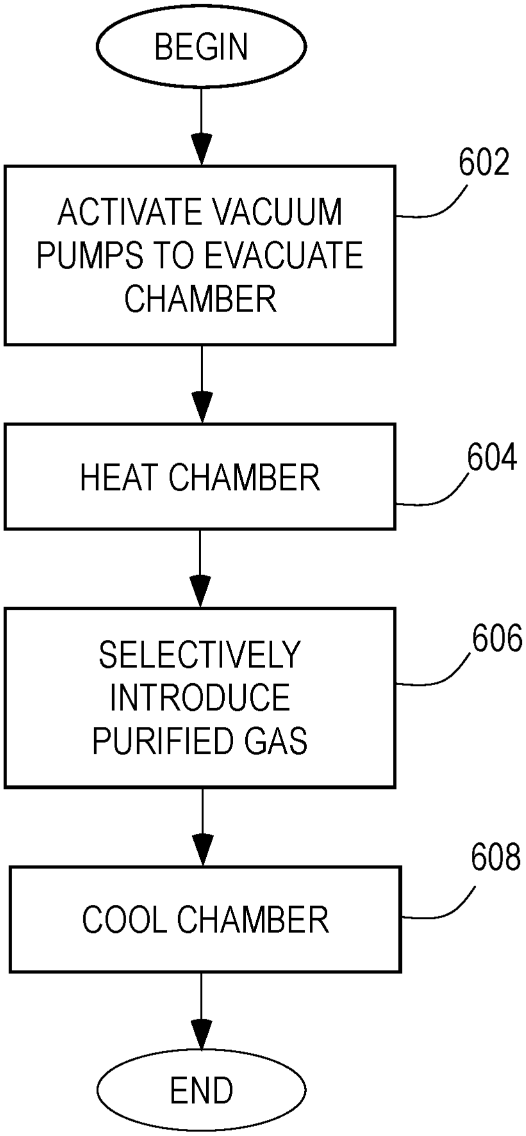
FIG. 6 comprises a flowchart for a vacuum cleaning process as configured in accordance with various embodiments of these teachings.

Referring now to FIG. 6, one example of a process 600 for cleaning a turbine part or component 110 is described. This process may be implemented using computer instructions that are executed by a controller or other processing device 124. During execution of these instructions, control signals may be created by the processor 124 and these control signals used to control heating elements (e.g., to heat a chamber or workspace 108 in a furnace 100), vacuum pumps 116 (e.g., to evacuate the chamber 108), and a gas purifier 120 (and/or valves allowing purified gas for the gas purifier 120 to enter the chamber 108).

At step 602, the vacuum pumps 116 are activated to evacuate the chamber 108 to a predetermined vacuum level. Sensors 105 in the chamber 108 may detect the vacuum level so that pumping can be halted once this level is reached.

At step 604, the chamber 108 is heated to a predetermined temperature. As mentioned, this may be accomplished by a controller 124 that activates, deactivates, and/or controls heating elements 114 such as heating coils that are disposed in the chamber 108. This step may also be accomplished in multiple stages over predetermined periods of time. One or more temperature sensors 105 in the chamber 108 may detect when the desired temperature level is reached.

At step 606, a purified gas is selectively introduced into the chamber 108. As mentioned, this may be accomplished by the controller 124 activating the gas purifier 120 and/or valves that control the entry of purified gas into the chamber 108. During and/or after the chamber is evacuated, the purified gas 204 may be drawn across the turbine part or component to be cleaned. The combination of the vacuum in the chamber 108 and the heating of the chamber 108 is effective to remove oxides from the turbine part or component 110 as the purified gas moves across the turbine part or component 110.

At step 608, the chamber 108 is cooled. As mentioned, this may be accomplished by a controller 124 that deactivates, and/or controls heating elements 114 such as heating coils that are disposed in the chamber 108. Other components such as fans can also be activated to cool the chamber 108. The turbine part or component 110 can then be removed from the chamber 108.

Figure 7:
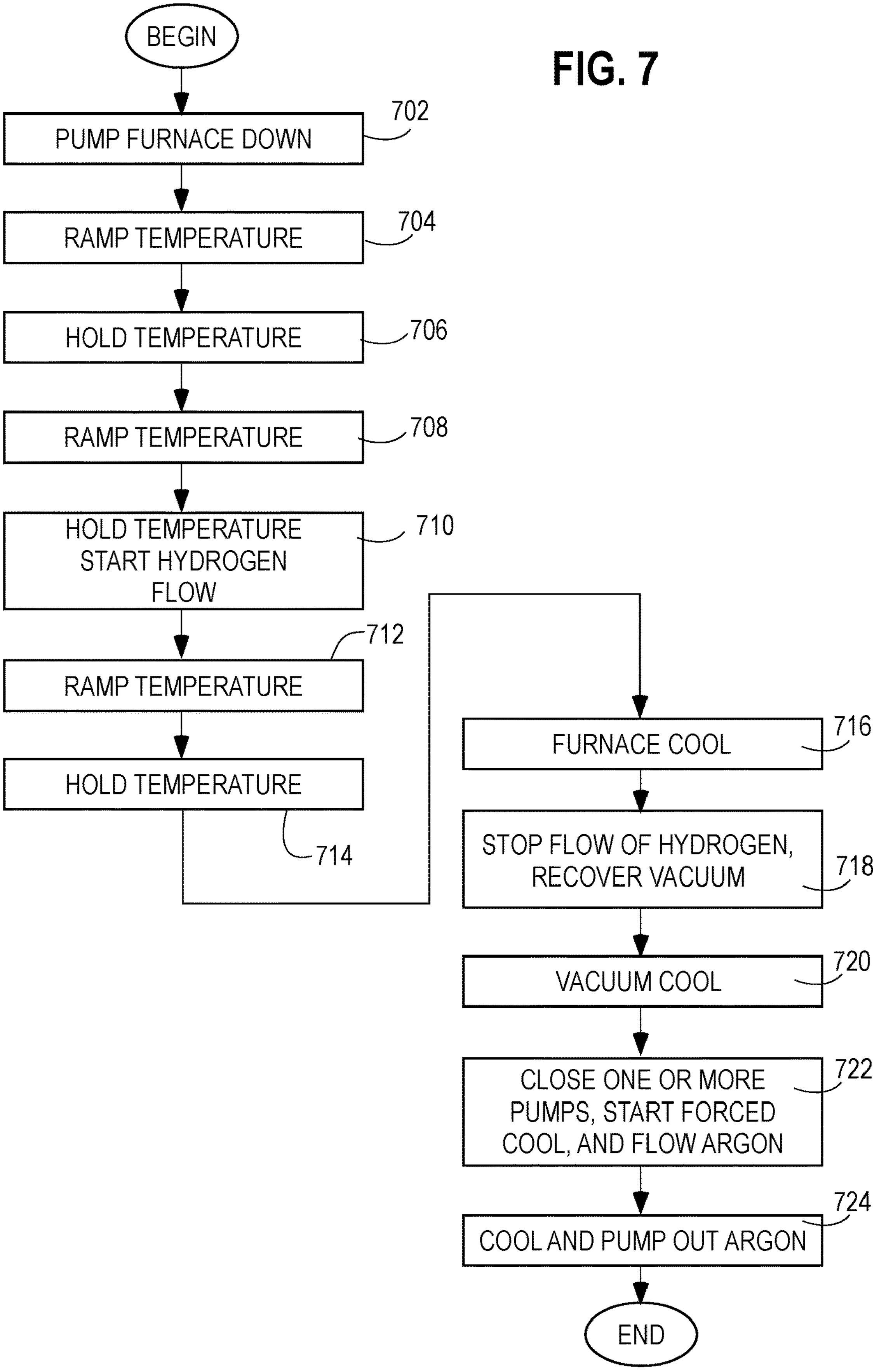
FIG. 7 comprises a flowchart for a vacuum cleaning process as configured in accordance with various embodiments of these teachings.

Referring now to FIG. 7, another example of a process 700 for cleaning a turbine part or component 110 is described. As with the example of FIG. 6, this process may be implemented using computer instructions that are executed by a controller, processor, or other processing device 124. During execution of these instructions, control signals may be created by the processor and these control signals used to control heating elements 114 (e.g., to heat the chamber), one or more vacuum pumps 116 (e.g., to evacuate the chamber), and a gas purifier 120 (and/or valves allowing purified gas 204 for the gas purifier to enter the chamber 108).

The process described with respect to FIG. 7 gives examples of values, for example, temperatures and vacuum levels. It will be appreciated that these are examples only and can be changed or adjusted based upon the needs of a specific system or user. It will be appreciated that these values may be monitored by sensors that are disposed with the chamber or workspace 108 of the furnace 100. Furthermore, the number and/sequence of these steps may be changed. For example, the approach described with respect to FIG. 7 involves increasing the temperature of the chamber in several discrete steps. However, the number of stepped increments and the amount of temperature increase of each step can be changed depending, for instance, upon the needs of a particular system or user.

At step 702, one or more vacuum pumps 116 are activated to pump the furnace 100 down to a predetermined vacuum level. In one example, the predetermined vacuum level does not exceed 1×10E-4 Torr.

At step 704, the heating elements 114 are activated to raise the temperature of the chamber 108 to a first temperature level. To take one example, the ramping begins at the initial temperature of the chamber 108 and occurs at a rate of 30 degrees F./minute until 1000 degrees F. is reached in the chamber 108. In aspects the predetermined vacuum level does not exceed 1×10E-4 Torr during this step.

At step 706, the temperature of the chamber 108 is held at the first temperature level achieved at step 704 for a first predetermined time. In one example, the temperature of the chamber 108 is held at 1000 degrees F. for 15-30 minutes. The heating elements 114 are controlled (e.g., selectively activated or deactivated) to achieve the holding of this temperature level for the predetermined time. In aspects, the predetermined vacuum level does not exceed 1×10E-4 Torr during this step.

At step 708, the heating elements 114 are further activated or controlled to further raise the temperature of the chamber 108 to a second temperature level. In one example, the ramping occurs at 30 degrees F./minute until 1400 degrees F. is reached. In aspects, the predetermined vacuum level does not exceed 1×10E-4 Torr during this step.

At step 710, the temperature is held at the second temperature level achieved at step 708 for a second predetermined time. In one example, the temperature is held at 1400 degrees F. for 1 minute. Valves controlling the flow of purified Hydrogen are also activated to start the flow of purified Hydrogen into the chamber 108.

At step 712, the heating elements 114 are further activated to further raise the temperature of the chamber 108 to a third temperature level. The ramping occurs at 60 degrees F./minute until 2200 degrees F. is reached.

At step 714, the temperature of the chamber 108 is held at the third temperature level achieved at step 712 for a third predetermined time. In one example, the temperature is held at 2200 degrees F. for 60-90 minutes.

At step 716, the chamber 108 is vacuum cooled to a fourth temperature level. In aspects, the fourth temperature level is less than the third temperature level. In examples, the chamber 108 is cooled to 1400 degrees F.

At step 718, the flow of Hydrogen into the chamber 108 is halted. One or more valves controlling the flow of purified Hydrogen are deactivated to halt the flow. In aspects, the predetermined vacuum level does not exceed 1×10E-4 Torr during this step.

At step 720, the chamber is vacuum cooled to a fifth temperature level. In one example, the chamber 108 is cooled to 1000 degrees F. In aspects, the predetermined vacuum level does not exceed 1×10E-4 Torr during this step.

At step 722, one or more of the vacuum pumps 116 (e.g., the diffusion pump) may be closed off. A forced cool is initiated and Argon is flowed into the chamber 108, for example, to approximately one atmosphere.

At step 724, the chamber is cooled to a sixth temperature level. In examples, the chamber is cooled to 150 degrees F. The Argon is pumped out of the chamber 108. The turbine part or component 110 can then be removed from the chamber 108.

Figure 8:
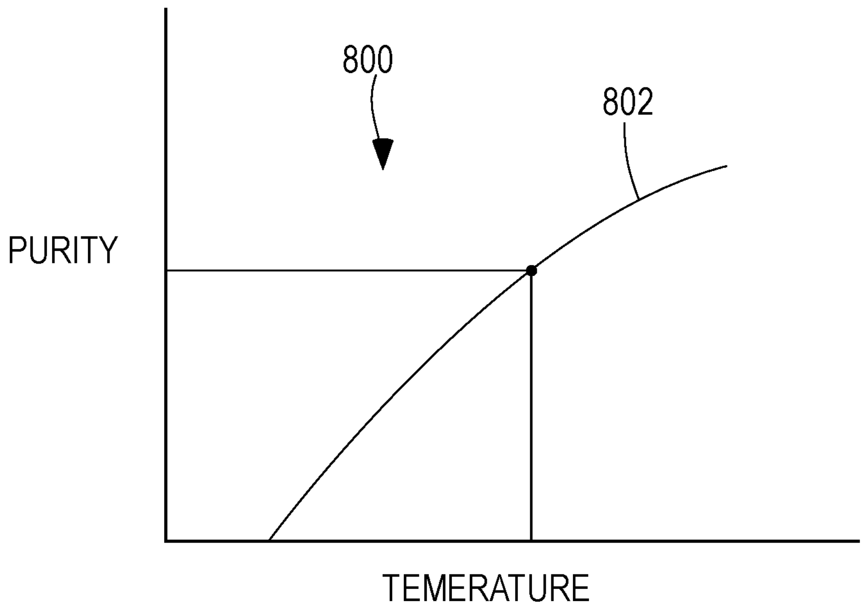
FIG. 8 comprise a diagram of a chart for determining a purity level as configured in accordance with various embodiments of these teachings.

Referring now to FIG. 8, one example of determining the purity levels needed for Hydrogen is described. As mentioned, the purity levels can be dynamically adjusted based on the type or composition of oxides to be removed.

A chart 800 includes a curve 802 for chromium oxide. The x-axis relates to a temperature of the furnace and the y-axis a purity level (e.g., a dew point, which relates and can be converted into a purity level). In one example, for a furnace running at 2000 degrees F., the dew point is-20 degrees F. for Hydrogen, and this can be mapped to a purity level as known by those skilled in the art.

A different and separate curve will relate to a second oxide (that is desired to be removed), another and different curve may relate to a third oxide (that is desired to be removed) and so forth. Consequently, different gases with different purity levels may be selected (and this may dynamically change) over time as different oxides may be desired to be removed from different turbine parts of components. For instance, a first part or component may need to have a first oxide removed while a second part or component may need to have a second oxide removed.

Figure 9:
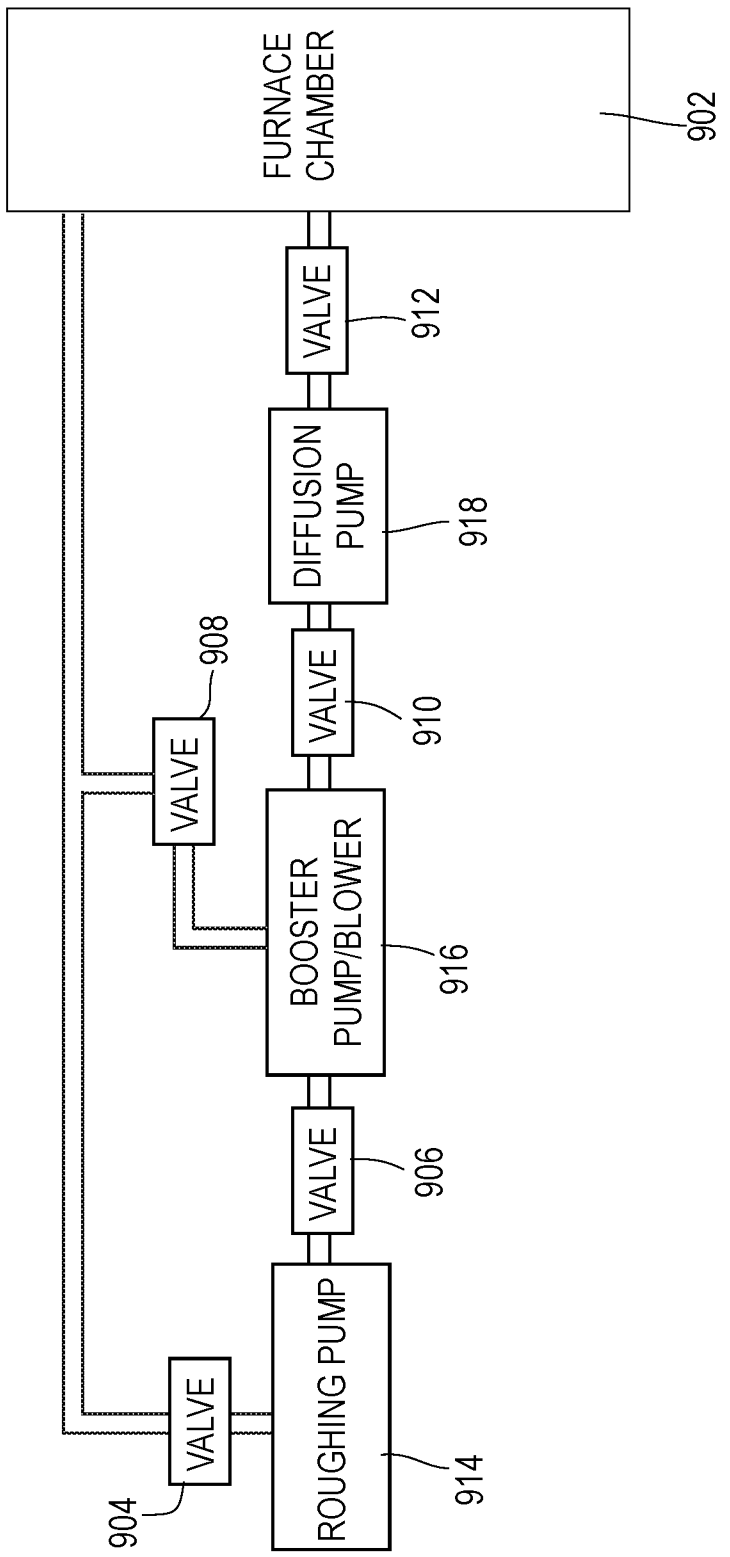
FIG. 9 comprises a diagram showing a three-pump vacuum pump system as configured in accordance with various embodiments of these teachings.

Referring now to FIG. 9, one example of a three-pump vacuum pumping system 900 is described. It will be appreciated that the use of three pumps is one example of an implementation of the approaches provided herein. Any number of pumps may be used, e.g., one, to implement these approaches.

The system of FIG. 9 includes a furnace chamber 902 coupled to a first vacuum tube or pipe 920 and a second vacuum tube or pipe 922, a first valve 904, a second valve 906, a third valve 908, a fourth valve 910, a fifth valve 912, a roughing pump 914, a booster pump 916, and a diffusion pump 918. Other pipes (unlabeled in FIG. 9) connect the valves and pumps together. It will be appreciated that the furnace chamber 902 is generally shown this diagram and the part or component to be cleaned is not shown in FIG. 9. One reason to use these three pumps instead of a single pump is that the overall operation of the system becomes more efficient and also does not rely on a single pump.

The roughing pump 914 is a vacuum pump that evacuates most of the pressure from the chamber. The booster pump 916 activates at a certain vacuum level and pumps the furnace chamber 902 to a medium vacuum value. The diffusion pump 918 evacuates the chamber 902 to the final, desired vacuum level.

The roughing pump 914, the booster pump 916, and the diffusion pump 918 are operated sequentially, one-after-the-other to evacuate the chamber 902 to a predetermined and desired vacuum level. The roughing pump 914, the booster pump 916, and the diffusion pump 918 may be controlled by a processor or controller to achieve desired vacuum levels.

Further aspects of the invention are provided by the subject matter of the following clauses:

A furnace system that is configured to clean oxide from surfaces of turbine components. The furnace system comprises a workspace configured to receive an aircraft part, the workspace being a volume and accessible through a controlled opening in the at least one wall; a heating element configured to heat the workspace to a predetermined temperature; a vacuum pump communicating with the workspace via a first port, wherein the vacuum pump is configured to achieve a predetermined vacuum level in the workspace; and a gas purifier communicating with the workspace via a second port, the gas purifier configured to remove impurities in a gas to create a purified gas, the gas purifier configured to direct the purified gas into the workspace, the purified gas being of a purity and composition that is effective to disassociate oxides on a surface or in a crack of the aircraft part when the workspace is heated to the predetermined temperature and the predetermined vacuum level is achieved in the workspace.

The furnace system of any preceding clause, further comprising a containment structure disposed in the workspace, the containment structure configured to receive the aircraft part and to receive the purified gas from the gas purifier.

The furnace system of any preceding clause, wherein the vacuum pump comprises: a roughing pump configured to provide a first value of first vacuum level measurement in the workspace; a blower pump configured to provide a second value of second vacuum level measurement in the workspace; and a diffusion pump configured to provide a third value of third vacuum level measurement in the workspace, wherein the first value is greater than the second value, and the second value is greater than the third value.

The furnace system of any preceding clause, wherein the workspace is defined by an outer wall and an inner wall, the outer wall surrounding and spaced from the inner wall.

The furnace system of any preceding clause, wherein the inner wall is constructed of stainless steel.

The furnace system of any preceding clause, wherein the gas is at least one of hydrogen and argon, and the purified gas is at least one of purified hydrogen or purified argon.

The furnace system of any preceding clause, wherein the predetermined temperature is greater than 1500 degrees F. and the predetermined vacuum level is less than $10^{-5}$ Torr.

The furnace system of any preceding clause, wherein the controlled opening comprises a door.

The furnace system of any preceding clause, further comprising a controller, the controller being configured to control operation of the heating elements to heat the chamber to a predetermined temperature, to control operation of the gas purifier to create the purified gas with a predetermined purity level, and to control operation of the one or more vacuum pumps to evacuate the chamber to the predetermined vacuum level.

The furnace system of any preceding clause, wherein the controller controls operation of the heating element to vary the predetermined temperature over time.

A method of cleaning surface oxides from turbine components, the method comprising: when a controlled opening of a furnace is closed, operating one or more vacuum pumps to achieve a predetermined vacuum level in a workspace of the furnace and heating the workspace to a predetermined temperature; and operating a gas purifier to remove impurities in a gas to create a purified gas, the purified gas being of a purity and composition that is effective to disassociate oxides on a surface or in a crack of an aircraft part to be cleaned when the workspace is heated to the predetermined temperature and the predetermined vacuum level is achieved in the workspace.

The method of any preceding clause, wherein the purified gas is directed to a containment structure spaced disposed in the workspace, the containment structure being configured to hold the aircraft part to be cleaned and to contain the purified gas in a vicinity of the aircraft part to be cleaned.

The method of any preceding clause, wherein the one or more vacuum pumps comprise a roughing pump configured to provide a first value of first vacuum level measurement in the workspace, a blower pump configured to provide a second value of second vacuum level measurement in the workspace and a diffusion pump configured to provide a third value of third vacuum level measurement in the workspace, wherein the first value is greater than the second value, and the second value is greater than the third value.

The method of any preceding clause, wherein the at least one wall comprises an outer wall and an inner wall, the outer wall surrounding and spaced from the inner wall.

The method of any preceding clause, wherein the purified gas has a purity level that is greater than 99.9999%.

The method of any preceding clause, wherein the gas is hydrogen or argon, and the purified gas is purified hydrogen or purified argon.

The method of any preceding clause, wherein the predetermined temperature is greater than 1500 degrees F. and the predetermined vacuum level is less than $10^{-5}$ Torr.

The method of any preceding clause, wherein the controlled opening comprises a door.

The method of any preceding clause, further comprising controlling operation of the heating elements, the gas purifier, and the one or more vacuum pumps using a controller.

The method of any preceding clause, wherein the controller controls operation of the heating element to vary the predetermined temperature over time.

Those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. A method of cleaning surface oxides from an aircraft part to be cleaned, the method comprising:

when an opening of a furnace is closed, operating one or more vacuum pumps to achieve a predetermined vacuum level in a workspace of the furnace and heating the workspace to a predetermined temperature using heating elements, the workspace being completely contained within an interior of the furnace and being defined by one or more internal walls of the furnace;

operating a gas purifier to remove impurities in a gas to create a purified gas, the purified gas being of a purity and composition that is effective to disassociate oxides on a surface or in a crack of the aircraft part to be cleaned when the workspace is heated to the predetermined temperature and the predetermined vacuum level is achieved in the workspace;

disposing a containment structure within the workspace and placing the aircraft part to be cleaned within the containment structure, the containment structure occupying a first volume that is substantially less than a second volume occupied by the workspace; and directing the purified gas into the containment structure via a passageway or pipe that is coupled to the containment structure and crosses portions of the workspace, all the heating elements being disposed outside the containment structure on the one or more internal walls, the containment structure being configured to completely enclose and surround the aircraft part to be cleaned and having a first opening in communication with the pipe or passageway to allow the purified gas to be drawn into the containment structure from the passageway or pipe, the purified gas then proceeding in a stream across a length of the containment structure and the aircraft part to be cleaned and being drawn through the containment structure by the one or more vacuum pumps, the purified gas exiting the containment structure via a second opening in the containment structure without dispersing into the workspace.

2. The method of claim 1, wherein the one or more vacuum pumps are selected from the group consisting of: a roughing pump configured to provide a first value of first vacuum level measurement in the workspace, a blower pump configured to provide a second value of second vacuum level measurement in the workspace and a diffusion pump configured to provide a third value of third vacuum level measurement in the workspace, wherein the first value is greater than the second value, and the second value is greater than the third value.

3. The method of claim 1, wherein the one or more internal walls comprise an outer wall of the furnace and an inner wall of the furnace, the outer wall surrounding and spaced from the inner wall.

4. The method of claim 1, wherein the purified gas has a purity level that is greater than 99.9999%.

5. The method of claim 1, wherein the gas is hydrogen or argon, and the purified gas is purified hydrogen or purified argon.

6. The method of claim 1, wherein the predetermined temperature is greater than 1500 degrees F. and the predetermined vacuum level is less than $10^{-5}$ Torr.

7. The method of claim 1, wherein the opening comprises a door.

8. The method of claim 1, further comprising controlling operation of the heating elements, the gas purifier, and the one or more vacuum pumps using a controller.

9. The method of claim 1, wherein the one or more internal walls are spherical.

10. The method of claim 1, wherein the containment structure comprises multiple containment structures and wherein the multiple containment structures are configured to hold different aircraft parts to be cleaned.

11. The method of claim 3, wherein the outer wall is spaced from the inner wall by a third volume, the third volume being filled with a cooling fluid or insulating material.

12. The method of claim 8, wherein the controller controls operation of the heating elements to vary the predetermined temperature over time.

13. A method of cleaning surface oxides from aircraft parts to be cleaned, the method comprising:

disposing containment structures within a workspace of a furnace and placing aircraft parts to be cleaned within the containment structures, each of the containment structures occupying a first volume that is substantially less than a second volume occupied by the workspace, the workspace being completely contained within an interior of the furnace and being defined by one or more internal walls of the furnace;

when an opening of the furnace is closed, operating one or more vacuum pumps coupled to the furnace to achieve a predetermined vacuum level in the workspace of the furnace and heating the workspace to a predetermined temperature;

supplying gas to a gas purifier;

operating the gas purifier to remove impurities in the gas to create a purified gas, the purified gas being of a purity and composition that is effective to disassociate oxides on surfaces or in cracks of the aircraft parts to be cleaned when the workspace is heated to the predetermined temperature and the predetermined vacuum level is achieved in the workspace; and directing the purified gas into each of the containment structures via a passageway or pipe that is coupled to each containment structure and crosses portions of the workspace, each of the containment structures not including heating elements, the containment structures being configured to completely enclose and surround the aircraft parts to be cleaned and to allow the purified gas to be drawn across the aircraft parts to be cleaned and each having a first opening in communication with the pipe or passageway to allow the purified gas to be drawn into each containment structure from the passageway or pipe, the purified gas then proceeding in a stream across a length of each containment structure and the aircraft part to be cleaned and being drawn through each containment structure by the one or more vacuum pumps, the purified gas exiting the containment structures via a second opening in each containment structure without dispersing into the workspace.

14. The method of claim 13, wherein the one or more vacuum pumps are selected from the group consisting of: a roughing pump configured to provide a first value of first vacuum level measurement in the workspace, a blower pump configured to provide a second value of second vacuum level measurement in the workspace and a diffusion pump configured to provide a third value of third vacuum level measurement in the workspace, wherein the first value is greater than the second value, and the second value is greater than the third value.

15. The method of claim 13, wherein the purified gas has a purity level that is greater than 99.9999%.

16. The method of claim 13, wherein the gas is hydrogen or argon, and the purified gas is purified hydrogen or purified argon.

17. The method of claim 13, wherein the predetermined temperature is greater than 1500 degrees F. and the predetermined vacuum level is less than $10^{-5}$ Torr.

18. The method of claim 13, wherein the opening comprises a door.

* * * * *